United States Patent
Hassmann et al.

(10) Patent No.: US 8,147,584 B2
(45) Date of Patent: *Apr. 3, 2012

(54) FILTER MEDIUM

(75) Inventors: Christian Hassmann, Mittelneufnach (DE); Hans-Jurgen Meitinger, Grossaitingen (DE); Kurt Ploetz, Waldems (DE); Juergen Umminger, Lauda-Koenigshofen (DE); Michael Schoeps, Berlin (DE)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,673

(22) Filed: Jun. 28, 2011

(65) Prior Publication Data

US 2011/0253645 A1 Oct. 20, 2011

Related U.S. Application Data

(62) Division of application No. 12/154,600, filed on May 23, 2008, now Pat. No. 7,993,427.

(30) Foreign Application Priority Data

Jun. 11, 2007 (DE) .................. 10 2007 027 299

(51) Int. Cl.
*B01D 46/00* (2006.01)

(52) U.S. Cl. ................. 55/486; 55/487; 55/527; 55/528

(58) Field of Classification Search ............ 55/486–489, 55/527, 528

See application file for complete search history.

(56) References Cited

U.S. PATENT DOCUMENTS

| | | | |
|---|---|---|---|
| 6,350,291 B1 * | 2/2002 | Gieseke et al. | 55/385.3 |
| 6,610,117 B2 * | 8/2003 | Gieseke et al. | 55/385.3 |
| 6,783,565 B2 * | 8/2004 | Gieseke et al. | 55/385.3 |
| 7,094,270 B2 * | 8/2006 | Schultink et al. | 55/486 |
| 7,303,604 B2 * | 12/2007 | Gieseke et al. | 55/385.3 |
| 7,993,427 B2 * | 8/2011 | Hassmann et al. | 55/486 |
| 2005/0210844 A1 * | 9/2005 | Kahlbaugh et al. | 55/486 |
| 2009/0272084 A1 * | 11/2009 | Healey et al. | 55/487 |
| 2010/0107881 A1 * | 5/2010 | Healey et al. | 96/11 |

* cited by examiner

*Primary Examiner* — Robert Clemente
(74) *Attorney, Agent, or Firm* — Robert D. Touslee

(57) ABSTRACT

The present invention relates to a filter composed of a multi-ply filter medium, which comprises at least one non-woven stiffening layer, at least one filtration layer, at least one covering layer and where necessary at least one non-woven microfibre layer, the non-woven stiffening layer comprising fibers of synthetic polymers and the fibers being both partially oriented and oriented fibers.

9 Claims, No Drawings

FILTER MEDIUM

This application claims priority of German application 10 2007 027 299.7 filed Jun. 11, 2007, and is a division of application Ser. No. 12/154,600, filed May 23, 2008.

The present invention relates to a filter composed of a multi-ply filter medium, a method for manufacturing said filter and the use of the filter according to the invention.

The use of filters, especially multi-ply filter media, has long been known. Air filters have long been used, for example, in the motor vehicle industry, in air conditioning systems, passenger compartment filters, pollen filters, clean room filters, domestic filters, etc. Filters have also been used for many years in the filtration of liquid media. Examples of these include oil filters and hydraulic filters.

The filters are designed to achieve a satisfactory filtration efficiency and service life according to the sphere of application. Thus low efficiency filters (LEF) are used as pre-filters in the filtration of air, gases and liquids, whilst high efficiency filters are also used in the sphere of HEPA (air) or water treatment.

U.S. Pat. No. 5,993,501 discloses multi-ply filter media and filters, which are composed of a stiff, pleatable base layer, the actual filtration layer and a covering. These filters are already well-suited to gas (air) and liquid filtration, and yet there is a constant demand for even better filters which, in particular, will allow a higher rate of air flow whilst at the same time having a high separation efficiency.

Surprisingly, it was found that the known filter media can be significantly improved by the use of special non-woven stiffening layers.

The subject matter of the present invention, therefore, is a filter composed of a multiply filter medium comprising:
a) at least one non-woven stiffening layer composed of synthetic, polymer fibres,
   a1) the non-woven fabric having a weight per unit area of 10 to 500 g/m$^2$,
   a2) the non-woven fabric having partially oriented and oriented fibres,
   a3) the titre of the oriented fibres ranging from 2 to 12 dtex,
   a4) the titre of the partially oriented fibres ranging from 8 to 25 dtex,
   a5) the non-woven fabric having an air permeability of at least 2500 l/m$^2$ sec,
b) at least one filtration layer, which is attached to at least one side of the non-woven stiffening,
c) at least one covering layer which is attached to the side of the filtration layer remote from the stiffening layer,
d) where necessary, at least on non-woven microfibre fabric layer.

The non-woven stiffening layer of synthetic, polymer fibres used according to the invention is a non-woven fabric which is pleatable.

The non-woven fabrics are wet non-woven fabrics, spinbonded fabrics or dry-laid non-woven fabrics, which are bonded by means of heat and/or chemical bonding and/or mechanical bonding. The non-woven fabrics are staple fibre non-woven fabrics and/or spinbonded fabrics.

The preferred embodiments for the spinbonded fabrics designated below also apply to the staple-fibre non-woven fabrics.

Spinbonded fabrics, that is to say so-called spunbonds, are produced by a random deposition of freshly melt-spun filaments. The filaments are continuous synthetic fibres composed of melt-spinnable polymer materials.

Suitable polymer materials are, for example, thermoplastics, preferably polyamides, such as polyhexamethylene-diapamide, polycaprolactam, aromatic or partially aromatic polyamides ("aramides"), aliphatic polyamides, such as nylon, partially aromatic or fully aromatic polyesters, polycarbonates (PC), polyphenylene sulphide (PPS), polyphenylene oxide (PPO), polystyrene (PS), polyvinyl carbazole (PVK), polyacetal (POM), polyaryl ether, polyaryl sulphone, polyether sulphone, polymers with ether and keto-groups, such as polyether ketones (PEK) and polyether etherketone (PEEK), polyolefins, such as polyethylene or polypropylene, or polybenzimidazoles.

The spinbonded fabrics preferably comprise or are composed of melt-spinnable polyesters. In principle, all types of polyester material suited to the production of fibres may feasibly be used. Such polyesters are for the most part composed of constituents derived from aromatic dicarboxylic acids and aliphatic diols. Possible aromatic dicarboxylic acid constituents are the bivalent residues of benzol dicarboxylic acids, especially terephthalic acid and isophthalic acid; possible diols have two to four C atoms, ethylene glycol being particularly suitable. Spinbonded fabrics which are composed of at least 85 mol % polyethylene terephthalate are particularly advantageous. The remaining 15 mol % are then made up of dicarboxylic acid units and glycol units, which act as so-called modification agents and which will enable the person skilled in the art to purposely influence the physical and chemical characteristics of the manufactured filaments. Examples of such dicarboxylic acid units are residues of isophthalic acid or of aliphatic dicarboxylic acid, such as glutaric acid, adipic acid, and sebacic acid; examples of modifying diol residues are those composed of longer-chain diols, such as propane diol or butane diol, of di or triethylene glycol or, if present in small quantities, of polyglycol with a molar weight of approximately 500 to 2000.

Polyesters containing at least 95 mol % of polyethylene terephthalate (PET) are particularly preferred, especially those composed of unmodified PET.

The polyesters contained in the spinbonded fabrics preferably have a molecular weight corresponding to an intrinsic viscosity (IV) of 0.6 to 1.4, measured in a solution of 1 g polymer in 100 ml dichloroacetic acid at 25° C.

In a further embodiment of the invention the spinbonded fabric may also be a fusible binder-bonded non-woven fabric, which contains carrier and hot melt adhesive fibres. The carrier and hot melt adhesive fibres may be derived from any thermoplastic filament-forming polymers. Carrier fibres may also be derived from non-fusing filament-forming polymers. Such fusible binder spinbonded fabrics are fundamentally described, for example, in EP-A 0,446,822 and EP-A 0,590,629.

Examples of polymers from which the carrier fibres can be derived are polyacrylonitrile, polyolefins, such as polyethylene or polypropylene, essentially aliphatic polyamides, such as nylon 6.6, essentially aromatic polyamides (aramides), such as poly-(p-phenylene terephthalate) or copolymers containing a proportion of aromatic m-diamine units to improve the solubility or poly-(m-phenylene isophthalate), essentially aromatic polyesters, such as poly-(phydroxy benzoate) or preferably essentially aliphatic polyesters, such as polyethylene terephthalate The relative proportion of the two fibre types may be selected within wide limits, whilst making sure that the proportion of the hot melt adhesive fibres is sufficient to bond the carrier fibres to the hot melt adhesive fibres, thereby endowing the non-woven fabric with a strength sufficient for the intend application, whilst on the other hand ensuring the necessary air permeability. The proportion of the hot melt adhesive in the non-woven fabric originating from the hot melt adhesive fibres is usually less than 50% by weight (in relation to the weight of the non-woven fabric material).

Modified polyesters having a melting point 10 to 50° C., preferably 30 to 50° C., lower than the raw material of the non-woven fabric are particularly suitable as hot melt adhesive. Examples of such a hot melt adhesive are polypropylene, polybutylene terephthalate, or polyethylene terephthalate modified by the condensation of longer-chain diols and/or isophthalic acid or aliphatic dicarboxylic acid.

The hot melt adhesives are preferably incorporated into the non-woven fabrics in fibrous form.

The carrier and hot melt adhesive fibres are preferably made up of one class of polymers. This implies that all of the fibres used are selected from one class of substances, so that these can readily be recycled after the non-woven fabric has been used. If the carrier fibres are composed of polyester, for example, the hot melt adhesive fibres selected will likewise be of polyester or a mixture of polyesters, for example in the form of bi-component fibres with PET in the core and a polyethylene terephthalate copolymer having a low melting point as outer coat. In addition, however, bi-component fibres which are made up of different polymers are also possible. Examples of these are bi-component fibres of polyester and polyamide (core/outer coat).

The monofilament titre of the carrier and the hot melt adhesive fibres may be selected within wide limits. Examples of common titre ranges are 1 to 16 dtex, preferably 2 to 6 dtex.

The filaments or staple fibres making up the non-woven fabrics may have a virtually circular cross section or may also have other shapes, such as dumb bell-shaped, reniform, triangular, trilobal or multilobal cross sections. Hollow fibres and bi-component or multi-component fibres may also be used. The hot-melt adhesive fibres may also be used in the form of bi-component or multi-component fibres.

The fibres forming the non-woven stiffening may also be modified by means of the usual additives, for example by antistatic agents such as carbon black, or additives which will permit an electrostatic charge.

The weight per unit area of the non-woven stiffening layer is preferably between 20 and 300 g/m$^2$, most preferably 20 and 200 g/m$^2$, especially between 40 and 200 g/m$^2$.

Depending on the application profile of the filters, the spinbonded fabrics forming the spinbonded fabrics forming the non-woven stiffening are subjected after manufacture to a chemical and/or heat bonding in addition to the hydrodynamic bonding.

For this purpose the fusible binder spinbonded fabrics, which also contain binding fibres in addition to carrier fibres, are bonded by hot-calendering or in an oven in a manner known in the art. The fibres may also have a bi-component structure (for example, core/outer coat), in which the outer coat is the binding polymer.

If the spinbonded fabrics do not contain any binding fibres capable of heat-bonding, these spinbonded fabrics are impregnated with a chemical binder. Acrylate or styrene-based binders are particularly suitable for this purpose. The proportion of binder is appropriately up to 30% by weight, preferably 2 to 25% by weight. The precise choice of binder is determined by the particular sphere of operations of the processing firm.

In a further embodiment flame-inhibiting modified binders can also be used, or binders can even be dispensed with altogether.

In a further embodiment of the invention the non-woven stiffening has an embossed pattern statistically distributed or small, repeat impressions, preferably stippling, in which the compressed area, that is to say the totality of all thin, compacted points on the spinbonded fabric makes up 5 to 30%, preferably 8 to 20% of its total area. In the case of fusible binder spinbonded fabrics this embossed pattern can advantageously be applied in the calender bonding. If the non-woven stiffening is finally bonded by a chemical binder, the embossed pattern can likewise be applied by means of a calender. This embossed pattern, which is applied to both sides of the spinbonded fabric but preferably to only one surface of the spin-bonded fabric as the spinbonded fabric runs through a heated calendar, has a plurality of small impressions, 0.2 to 4 mm$^2$, preferably 0.5 to 2 mm$^2$ in size, which are separated from one another by intervening, unstamped surface elements of the fabric of approximately the same size. The area of the compressed parts of the non-woven fabric and the uncompressed parts of the non-woven fabric can be determined by means of photomicrographic cross sections, for example.

Where the non-woven stiffening requires further bonding, this is done by needle punching, both mechanically and hydrodynamically. Needle densities of 20 to 100 pricks/cm$^2$ are commonly used.

In a preferred embodiment the non-woven stiffening has been bonded without needle punching and without the addition of chemical binders, but with thermoplastic binders.

Where the non-woven stiffening is formed from at least two different non-woven fabrics, these are preferably joined together by mechanical and/or hydrodynamic needle punching. Besides this method, the different non-woven layers of the non-woven stiffening can also be laminated by means of a calender.

In a preferred embodiment of the invention the non-woven stiffening layer is composed of two to ten non-woven layers, the total weight per unit area of the non-woven stiffening layer being between 10 and 500 g/m$^2$, preferably between 20 and 300 g/m$^2$, and in particular between 40 and 200 g/m$^2$. Where the non-woven stiffening layer has a multi-ply structure, at least two of the non-woven layers, preferably at least three of the non-woven layers, are different. In particular layers of fusible binder fibres are arranged between the non-woven layers of carrier fibres.

The individual titre of the fibres of synthetic polymers, which form the non-woven stiffening, is between 2 and 20 dtex.

The non-woven stiffening in the filter according to the invention is made up of oriented and partially oriented fibres of synthetic polymers.

The proportion of partially oriented fibres in the non-woven stiffening is at least 5% by weight (in relation to the total weight of the non-woven stiffening layer), preferably at least 10% by weight, most preferably at least 20% by weight.

The term oriented fibres denotes those fibres which have a birefringence index of $130\text{-}150 \times 10^{-3}$. The titre of the oriented fibres is between 2 and 12 dtex, preferably 4 to 10 dtex.

The term partially oriented fibres denotes those fibres which have a birefringence index of $50\text{-}120 \times 10^{-3}$. The titre of the partially oriented fibres is between 8 and 25 dtex, preferably 10 to 20 dtex In a further embodiment the oriented fibres have a lower titre than the partially oriented fibres.

The oriented and partially oriented fibres may occur in the form of concrete layers in the non-woven stiffening fabric or are mixed with one another. The oriented and partially oriented fibres preferably occur as a mixture. In a further embodiment the oriented and partially oriented fibres form a gradient in the non-woven stiffening fabric. It is advantageous here if the gradient, that is to say the titre of the fibres increases from the outside inwards (in relation to the cross section).

The non-woven stiffening in the filter according to the invention has an air permeability of at least 2500 l/m² sec, preferably of at least 3500 l/m² sec, measured according to ISO 9237.

The non-woven stiffening in the filter according to the invention may additionally also be finished with common substances, such as antistatic agents or substances capable of influencing the flammability characteristics. In addition a hydrophobic or hydrophilic finish is also possible.

The filtration layer used according to the invention is not subject to any particular restriction. The particular filtration layer is selected according to the requirement profile.

The filtration layers may be non-woven fabrics of polymer fibres or filaments. The materials used are preferably polyolefins, in particular PE and/or PP, and polyesters, in particular PBT and/or PET, but all other materials suitable for the stiffening layer can also be used for the filtration layer. The non-woven fabrics may be manufactured by known methods. For example, the filter element may be a spinbonded fabric or a staple fibre non-woven fabric, manufactured by the wet laying method or dry laying method, or also a non-woven fabric produced by the air-laid method or a similar process.

The filtration layers can moreover be produced by means of the melt blown method or be composed of nanofibres, which are manufactured by the electrospinning method, for example. In principle, mixtures of different fibre/filament materials, titres and fibre cross sections are furthermore possible. It is also possible to use bi-component fibres and filaments.

Besides so-called filter papers, non-woven mineral fibre fabrics or non-woven glass fibre fabrics, preferably dry-laid non-woven glass fibre fabrics (so-called "air laid" non-woven fabrics) are preferred.

The non-woven mineral fibre fabrics are non-woven fabrics based on alumino silicate, ceramic, or dolomite fibres or fibres of vulcanites, such as basalt diabase, melaphyre diabase (greenstone) and melaphyres (so-called paleobasalts).

In the case of the non-woven glass fibre fabrics, the glass fibres used are not subject to any substantial restriction with regard to the type of glass, so that in principle all types of glass such as E glass, S glass, R glass, and C glass may be used. For economic reasons E glass or C glass is preferred. Biosoluble glasses are especially preferred.

The non-won mineral fibre fabric and the non-woven glass fibre fabric may be formed from filaments, that is to say fibres of infinite length or from staple fibres. The average length of the staple fibres is between 40 and 100 mm, preferably 50 to 90 mm.

The non-woven fabrics may be manufactured by known wet or dry laying methods. The non-woven filter fabric is most preferably produced by the air media method (pole and marble method, see U.S. Pat. No. 5,993,501). The average diameter of the mineral and glass fibres produced in this way is between 0.5 and 5 µm, preferably between 0.7 and 3.5 µm.

The weight per unit area of the filtration layer is between 15 and 100 g/m², preferably between 30 and 90 g/m² Depending on the requirement profile, the filtration layer may be made up of different layers, and the layers may be made up both of non-woven mineral fibre fabrics and/or non-woven glass fibre fabrics.

The filtration layer in the filter according to the invention contains between 5 and 25% by weight of binders. For some applications it is advantageous if the filtration layer, in addition to the non-woven fabrics bonded with binders, also contains non-woven fabrics which have no binder, in particular no fusible, organic binder.

The thickness of the filtration layer in the filter according to the invention is between 1 and 10 mm, preferably between 2 and 8 mm.

The filtration layer used exhibits an average air filtration efficiency of 20 to 95% (measured according to. EN779). For filters with higher air filtration efficiency, for example 80% and more, the average diameter of the mineral and glass fibres is between $3.0 \times 10^{-5}$ and $4.1 \times 10^{-5}$ inches (0.76 µm-1.04 µm).

The covering layer used according to the invention is a textile structure of synthetic, polymer fibres. Non-woven fabrics, woven fabrics, scrims, warp-knitted fabrics and knitted fabrics are used as textile structure, non-woven fabrics being preferred due to their technical availability.

The non-woven fabrics are wet sheet materials, spinbonded fabrics or dry-laid non-woven fabric materials, which are bonded by heat and/or chemical bonding and/or mechanical bonding. The non-woven fabrics are staple fibre non-wovens and/or spinbonded fabric materials.

The preferred embodiments for the spinbonded fabric materials described below also apply for staple fibre non-woven fabrics.

Spinbonded fabrics, that is to say so-called spunbonds, have already been described in connection with the non-woven stiffening layer. They are produced by a random deposition of freshly melt-spun filaments.

Suitable polymer materials are, for example, thermoplastics, preferably polyamides, such as polyhexamethylene-diadipamide, polycaprolactam, aromatic or partially aromatic polyamides ("aramides"), aliphatic polyamides, such as nylon, partially aromatic or fully aromatic polyesters, polycarbonates (PC), polyphenylene sulphide (PPS), polyphenylene oxide (PPO), polystyrene (PS), polyvinyl carbazole (PVK), polyacetal (POM), polyaryl ether, polyaryl sulphone, polyether sulphone, polymers with ether and keto-groups, such as polyether ketones (PEK) and polyether etherketone (PEEK), polyolefins, such as polyethylene or polypropylene, or polybenzimidazoles.

The preferred embodiments for the spinbonded fabrics described in connection with the non-woven stiffening layer also apply for the covering layer, the weight per unit area of the covering layer being between 10 and 50 g/m², preferably between 15 and 30 g/m².

The covering layer has a high air permeability and among other things is intended to prevent fibres in the filtration layer being removed from the filter. In addition the covering layer acts as pre-filter for the filtration layer.

The covering layer is essentially free of binders and is exclusively heat-bonded. It is furthermore advantageous if the covering layer has not been needle punched.

In a further embodiment of the invention the covering layer comprises multiple layers. Two to six layers are preferred, at least two of the layers being differently formed. The total weight of such a multi-ply covering layer is between 10 and 50 g/m², preferably between 15 and 30 g/m².

The titre of the individual fibres of synthetic polymers forming the covering layer is between 0.8 and 16 dtex, preferably 1 to 12 dtex.

The covering layer in the filter according to the invention has an air permeability of at least 3000 l/m² sec, preferably of at least 6000 l/m² sec, measured according to EN ISO 9237.

The non-woven microfibre layer used according to the invention is a textile structure composed of polymer melt-blown fibres or also nanofibres.

The non-woven microfibre fabric forming the non-woven microfibre layer is manufactured by melt blowing, jet spinning or an electrostatic spinning method. The fibre diameters are less than 20 μm, preferably less than 10 μm.

Suitable polymer materials are, for example, thermoplastics, preferably polyamides, such as polyhexamethylene-dia-dipamide, polycaprolactam, aromatic or partially aromatic polyamides ("aramides"), aliphatic polyamides, such as nylon, partially aromatic or fully aromatic polyesters, polycarbonates (PC), polyphenylene sulphide (PPS), polyphenylene oxide (PPO), polystyrene (PS), polyvinyl carbazole (PVK), polyacetal (POM), polyaryl ether, polyaryl sulphone, polyether sulphone, polymers with ether and keto-groups, such as polyether ketones (PEK) and polyether etherketone (PEEK), polyolefins, such as polyethylene or polypropylene, or polybenzimidazoles.

The preferred embodiments for the spinbonded fabrics described in connection with
the non-woven stiffening layer also apply for the non-woven microfibre fabrics, the weight per unit area of the non-woven microfibre layer being between 10 and 60 g/m², preferably between 20 and 40 g/m². In the case of pure nanofibres the weight per unit area is 0.1-2 g/m²

The non-woven microfibre layer is essentially free of binders and is exclusively heat-bonded.

In a further embodiment of the invention the non-woven microfibre layer has multiple layers. Multiple layers are preferred particularly in the case of higher weights per unit area, and at least two of the layers may also be differently formed. The total weight of such a multi-ply non-woven microfibre layer is between 20 and 120 g/m², preferably between 20 and 80 g/m². In the case of pure nanofibre layers the total weight per unit area is 0.2 to 4 g/m².

The filter according to the invention is manufactured by known methods available to the person skilled in the art. Suitable methods, for example, are set forth in U.S. Pat. No. 5,993,501. The formation of spinbonded fabrics will likewise be a matter of general knowledge to the person skilled in the art.

The filter is manufactured by forming the non-woven stiffening layer, applying the filtration layer, preferably in such a way that the binder present in the filtration layer has not yet completely bonded. The final bonding occurs in an oven or drier, where necessary with the aid of a calender. Where necessary, additional binder may also be applied. This is necessary particularly when the other layers (covering layer and/or the non-woven microfibre layer) do not contain any binder.

The filtration layer may be formed separately or directly on the non-woven stiffening layer.

The covering layer may be formed separately or directly on the filtration layer.

The non-woven microfibre layer may be formed separately or directly on the covering layer. In a further embodiment of the invention the non-woven microfibre layer is inserted between the non-woven stiffening layer and the filtration layer. In this case the non-woven microfibre layer may be produced directly on the non-woven stiffening layer or inserted already made up. The non-woven microfibre layer may furthermore also be present on both sides of the non-woven stiffening layer.

In addition the non-woven microfibre layer may also be produced separately on the covering layer or be joined to the latter. The composite comprising the covering layer and non-woven microfibre layers is then joined to the filtration layer.

The filters according to the invention are used in air/gas and liquid filtration, particularly in the motor vehicle industry, in air conditioning systems, passenger compartment filters, pollen filters, clean room filters, domestic filters, and as oil filters and hydraulic filters.

The subject matter of the present invention therefore also includes filter modules and cartridges, which contain the filter according to the invention. Here the filters are fitted in pleated form in housings or other enclosures. Appropriate designs are set forth in U.S. Pat. No. 5,883,501.

Another sphere of application of the filters according to the invention are so-called low efficiency filters (LEF) and high efficiency particulate air (HEPA) filters, the latter also being used in water treatment. The HEPA filters are also designated according to EN 1822 as filter classes H10 to H14.

A further sphere of application of the filters according to the invention are so-called HVAC and so-called ASHRAE filter media.

A further sphere of application of the filters according to the invention are so-called ULPA filters, that is to say filters for clean rooms and sterile rooms (ISO class 1000 and above). ULPA filters are also designated according to EN 1822 as filter classes U15 to U17.

What is claimed is:

1. A filter composed of a multi-ply filter medium comprising:
    a) at least one non-woven stiffening layer of synthetic, polymer fibres,
       a1) the non-woven stiffening layer that is configured to be pleatable,
       a2) the non-woven stiffening layer having partially oriented and oriented fibres,
       a3) the titre of the oriented fibres ranging from 2 to 12 dtex,
       a4) the titre of the partially oriented fibres ranging from 8 to 25 dtex,
       a5) the non-woven stiffening layer having an air permeability of at least 2500 l/m² sec,
    b) at least one filtration layer which is attached to at least one side of the non-woven stiffening layer,
    c) at least one covering layer which is attached to the side of the filtration layer remote from the stiffening layer.

2. The filter according to claim 1, characterised in that the oriented fibres have a birefringence index of $130$-$150 \times 10^{-3}$.

3. The filter according to claim 1, characterised in that the partially oriented fibres have a birefringence index of $50$-$120 \times 10^{-3}$.

4. A method for manufacturing the filter, comprising the following steps:
    a) providing a non-woven stiffening layer that comprises partially oriented and oriented fibres, wherein the titre of the oriented fibres ranges from 2 to 12 dtex, wherein the titre of the partially oriented fibres ranges from 8 to 25 dtex, and wherein the non-woven stiffening layer has an air permeability of at least 2500 l/m² sec,
    b) attaching a filtration layer to one side of the non-woven stiffening layer,
    c) attaching a covering layer to a side of the filtration layer that is remote from the stiffening layer.

5. The method according to claim 4, characterised in that the filtration layer is formed directly on the non-woven stiffening layer.

6. The method according to claim 4, characterised in that the covering layer is formed directly on the filtration layer.

7. The method according to claim 4, further comprising forming a non-woven microfibre layer directly on the covering layer and/or the non-woven stiffening layer.

8. The method according to claim 4, further comprising filtering air/gas and liquids through the filter.

9. The method according to claim 4, further comprising pleating the non-woven stiffening layer.

* * * * *